(12) United States Patent
Morris

(10) Patent No.: US 7,364,174 B2
(45) Date of Patent: Apr. 29, 2008

(54) MAGNETIC MOTOR AXLE FOR SKATEBOARDS

(76) Inventor: James Morris, 4111 SW. 32$^{nd}$ St., Hollywood, FL (US) 33026

( * ) Notice: Subject to any disclaimer, the term of this patent is extended or adjusted under 35 U.S.C. 154(b) by 345 days.

(21) Appl. No.: 10/943,178

(22) Filed: Sep. 16, 2004

(65) Prior Publication Data

US 2006/0145443 A1   Jul. 6, 2006

(51) Int. Cl.
  *B62M 1/00*  (2006.01)
(52) U.S. Cl. .................. 280/87.042; 280/87.041; 280/87.021
(58) Field of Classification Search ....... 280/87.041–2, 280/87.021, 11.203, 87.01; 180/65.1, 65.5; 446/136; 318/1, 2; 310/156.08, 154.36
  See application file for complete search history.

(56) References Cited

U.S. PATENT DOCUMENTS

| | | | | |
|---|---|---|---|---|
| 5,330,026 A | * | 7/1994 | Hsu et al. .................. | 180/181 |
| 5,893,425 A | * | 4/1999 | Finkle ........................ | 180/181 |
| 5,967,530 A | * | 10/1999 | Chung ....................... | 280/11.19 |
| 6,356,000 B1 | * | 3/2002 | Ho et al. ................ | 310/154.01 |
| 6,396,180 B1 | * | 5/2002 | Blakesley .............. | 310/156.08 |
| 6,621,419 B2 | * | 9/2003 | Chiu ...................... | 340/815.42 |
| 6,661,145 B1 | * | 12/2003 | Nilson .................... | 310/156.22 |
| 7,067,948 B2 | * | 6/2006 | Yamaguchi et al. ... | 310/156.47 |
| 2003/0062785 A1 | * | 4/2003 | Vasudevan .................. | 310/152 |

* cited by examiner

*Primary Examiner*—Christopher P. Ellis
*Assistant Examiner*—Vaughn T. Coolman
(74) *Attorney, Agent, or Firm*—Gold & Rizvi, P.A.; Glenn E. Gold; H. John Rizvi

(57) ABSTRACT

A magnetic motor axle for magnetically augmenting the propulsion efficiency and duration of a skateboard is disclosed. The magnetic motor axle includes a truck for mounting on a step board of a skateboard. Multiple truck magnets are provided in the truck. An elongated rotor assembly is rotatably mounted in the truck, and multiple rotor magnets are provided on the rotor assembly. As the rotor assembly rotates in the truck, the truck magnets magnetically repel the respective rotor magnets to augment the torque of the rotor assembly. As least one drive wheel is drivingly engaged by the rotor assembly to drive the skateboard on a surface.

22 Claims, 14 Drawing Sheets

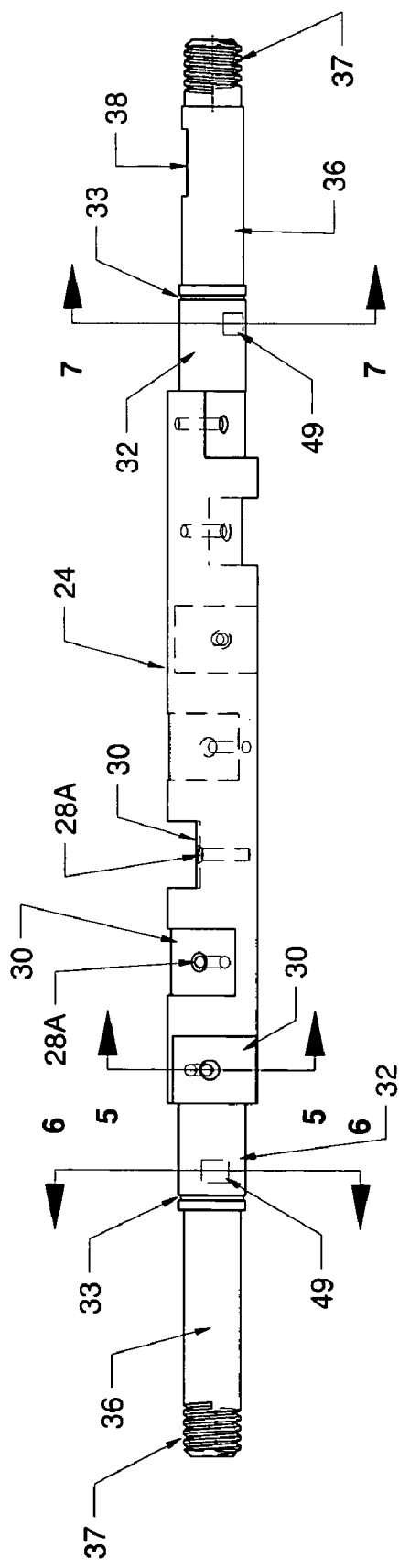
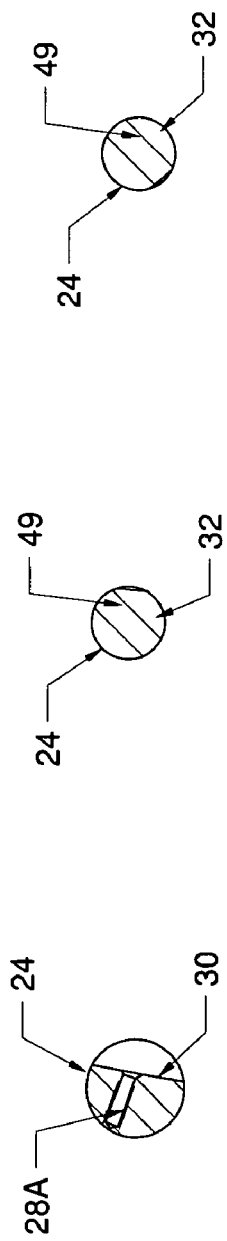
Fig. 4
Fig. 5
Fig. 6
Fig. 7

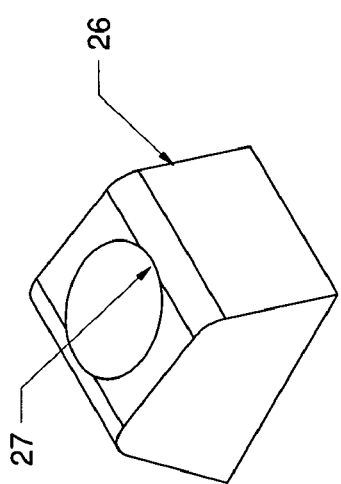
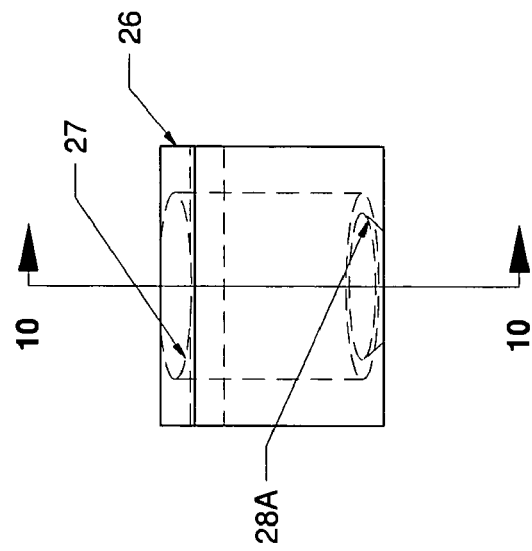
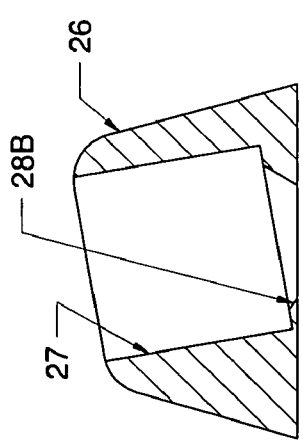

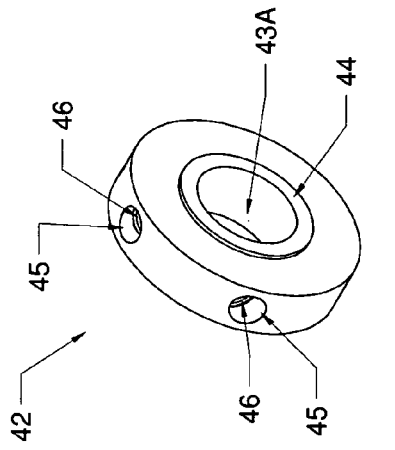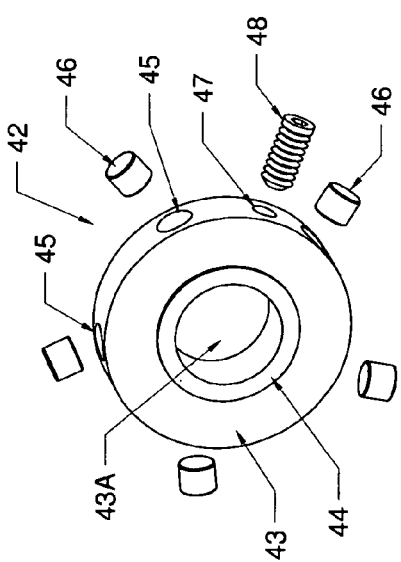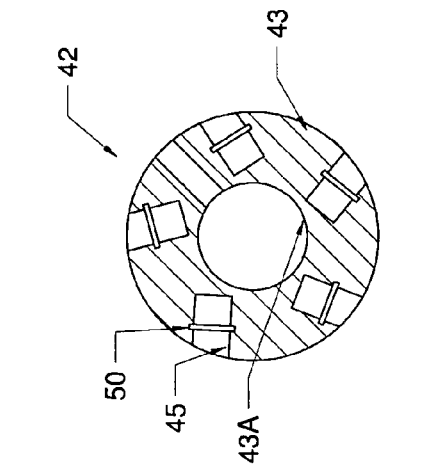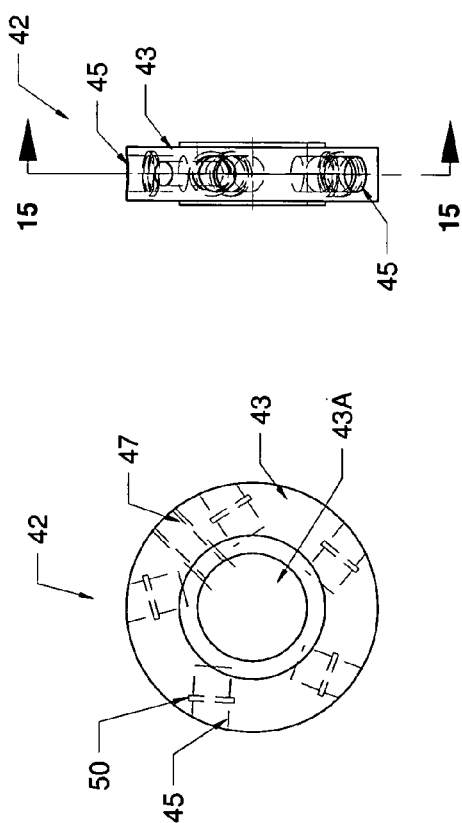

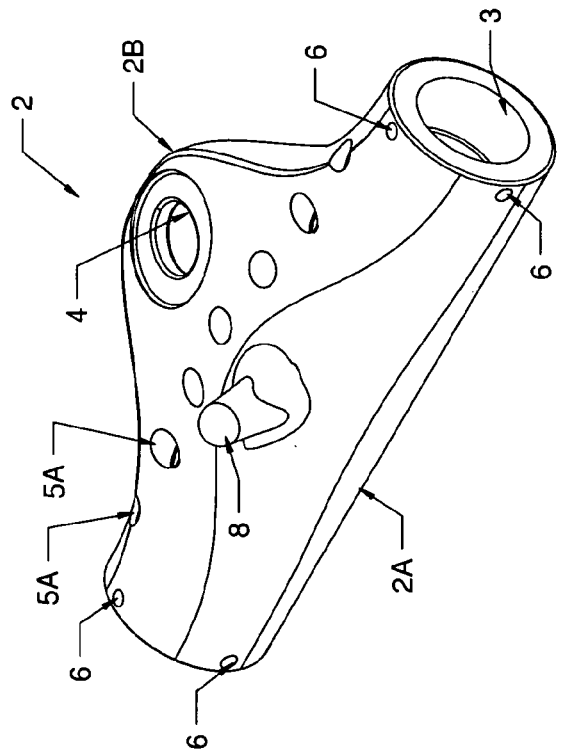
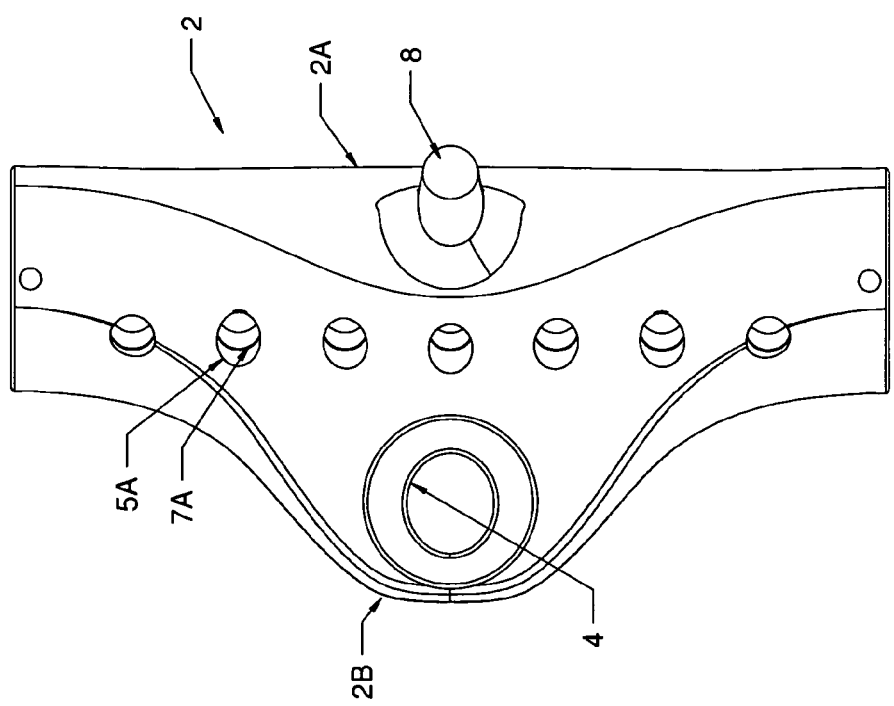

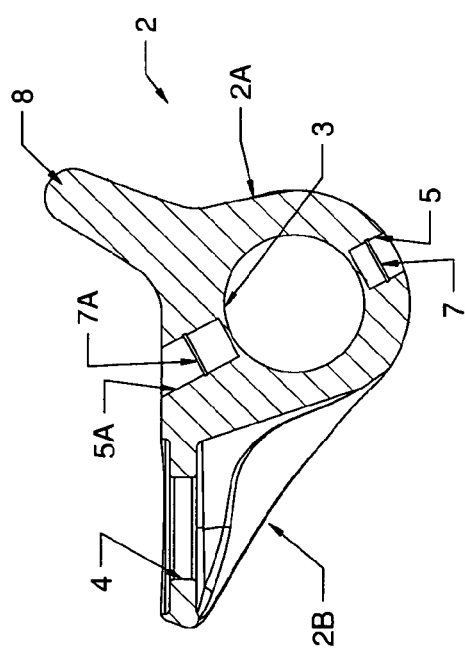
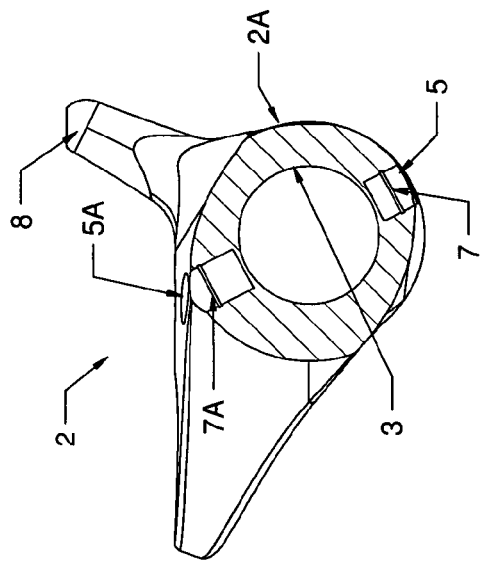
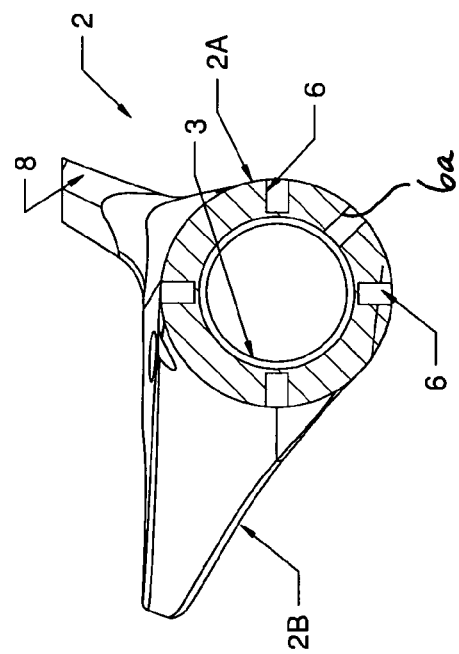

MAGNETIC MOTOR AXLE FOR SKATEBOARDS

FIELD OF THE INVENTION

The present invention relates generally to skateboards. More particularly, the present invention relates to a novel magnetic motor axle which magnetically augments the propulsion efficiency and duration of a skateboard.

DESCRIPTION OF THE PRIOR ART

In recent decades, skateboarding has become increasingly popular as a form of transportation, recreation and exercise. As far back as the 1950s, skateboarding was regarded as a substitute for surfing insofar as the sport enables persons to improve and exhibit balancing skills. Over the years, skateboarding has developed into a sport which requires not only superior balancing skills but also the ability to skillfully manipulate a skateboard with the feet while performing a variety of complex terrestrial and acrobatic maneuvers. For example, the popular trick- or freestyle-type skateboarding includes aerial moves known as "ollies", in which a rider taps on the tail of a skateboard with one foot and slides the other foot, enabling the rider to jump over immovable objects with the board.

A conventional skateboard includes an elongated step board and two wheel assemblies attached to the bottom surface of the step board. Each of the wheel assemblies includes a truck which is connected to the step board. A pair of axles extends from the truck, and wheels are rotatably mounted on the respective axles. The wheels on a skateboard are very important for the performance of the skateboard. Typically, a skateboard wheel uses a dual-bearing configuration in which stainless steel or ceramic ball bearings are interposed between an inner race that encircles the axle and an outer race that is provided in the center of the wheel. The quality of the ball bearings is crucial for the reduction of friction between the wheels and the axles, since the ball bearings determine the propulsion speed and duration of the skateboard. However, because the ball bearings always induce some degree of friction between the wheel and axle, the propulsion efficiency and duration of skateboards is limited. Moreover, natural drag forces act on the skateboard during use to further limit propulsion of the skateboard.

Accordingly, there is a need for a magnetic motor axle which can be installed on a skateboard to enhance the propulsion efficiency and duration of the skateboard to at least partially overcome the frictional and drag forces acting on a skateboard during use.

SUMMARY OF THE INVENTION

The invention is directed to a magnetic motor axle which can be mounted on a skateboard to enhance the propulsion efficiency and duration of the skateboard as the skateboard rolls on a surface. The magnetic motor axle includes an elongated truck which is mountable to the bottom surface of a step board. Multiple, spaced-apart truck magnets are seated in respective magnet seats provided in the truck. An elongated rotor assembly is rotatably mounted in the truck and includes a pair of terminal axle segments which extend from respective ends of the truck. A pair of drive wheels or a drive wheel and a free wheel is/are mounted on the respective axle segments. Multiple rotor magnets are provided on the rotor assembly in spaced-apart relationship to each other and are arranged around the circumference of the rotor assembly. The rotor magnets in the rotor assembly correspond in number and position to the respective truck magnets in the truck and are of the same polarity as the truck magnets. Accordingly, as the skateboard is rolled along a surface, the rotor magnets on the rotor assembly are rotated adjacent to and then beyond the respective stationary truck magnets on the truck. Simultaneously, the rotor magnets are repelled by the truck magnets, thus imparting additional torque to the rotor assembly, which transmits this torque to the drive wheel or wheels. Therefore, the propulsion efficiency and duration of the skateboard on the surface are enhanced.

In one general aspect of the present invention, a magnetic motor axle is provided for enhancing the propulsion efficiency and duration of a skateboard. The magnetic motor axle comprises:

a truck for mounting on the bottom surface of a step board;

multiple stationary truck magnets seated in the truck;

an elongated rotor assembly rotatably mounted in the truck;

multiple rotor magnets provided on the rotor assembly and having a polarity which is the same as that of the truck magnets for transiently interfacing with the respective truck magnets; and at least one drive wheel drivingly engaged by the rotor assembly.

In a further aspect of the present invention, at least one magnetic disk assembly is provided on the rotor assembly to augment the magnetic propulsion effect facilitated by the truck magnets and rotor magnets.

In yet another aspect of the present invention, a pair of magnetic disk assemblies is provided on the rotor assembly to augment the magnetic propulsion effect of the truck magnets and rotor magnets.

In another aspect of the present invention, each magnetic disk assembly includes multiple stationary magnets seated in the truck; a magnetic disk mounted on the rotor assembly; and multiple disk magnets seated in the magnetic disk and having a polarity which is the same as that of the respective stationary magnets, such that the stationary magnets in the truck sequentially repel the respective disk magnets in the magnetic disk to impart additional torque to the rotor assembly as the skateboard rolls on a surface.

In still a further aspect of the present invention, a truck mount bracket is provided for mounting the truck to the bottom surface of the step board.

In yet another aspect of the present invention, a drive wheel is provided on one end and a free wheel is provided on the opposite end of the rotor assembly.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 4 is a side view of the rotor assembly shown in FIG. 3;

FIG. 5 is a cross-sectional view of the rotor assembly, taken along section lines 5-5 in FIG. 4;

FIG. 6 is a cross-sectional view of the rotor assembly, taken along section lines 6-6 in FIG. 4;

FIG. 7 is a cross-sectional view of the rotor assembly, taken along section lines 7-7 in FIG. 4;

FIG. 8 is a perspective view of a magnet lobe element of the rotor assembly for the mounting of a rotor magnet to the rotor assembly;

FIG. 9 is a front view of the magnet lobe shown in FIG. 8;

FIG. 10 is a cross-sectional view of the magnet lobe, taken along section lines 10-10 in FIG. 9;

FIG. 11 is an exploded perspective view of a magnetic disk assembly of the magnetic motor axle;

FIG. 12 is a perspective view of a magnetic disk element of the magnetic disk assembly shown in FIG. 11;

FIG. 13 is a front view of the magnetic disk shown in FIG. 12, with interior magnet seats and retaining ring grooves shown in phantom;

FIG. 14 is a side view of the magnetic disk;

FIG. 15 is a cross-sectional view of the magnetic disk, taken along section lines 15-15 in FIG. 14;

FIG. 23 is a top perspective view of the truck element of the magnetic motor axle;

FIG. 24 is a top view of the truck;

FIG. 26 is a cross-sectional view of the truck, taken along section lines 26-26 in FIG. 25;

FIG. 27 is a cross-sectional view of the truck, taken along section lines 27-27 in FIG. 25;

FIG. 28 is a cross-sectional view of the truck, taken along section lines 28-28 in FIG. 25;

DETAILED DESCRIPTION OF THE PREFERRED EMBODIMENTS

Figure 1:
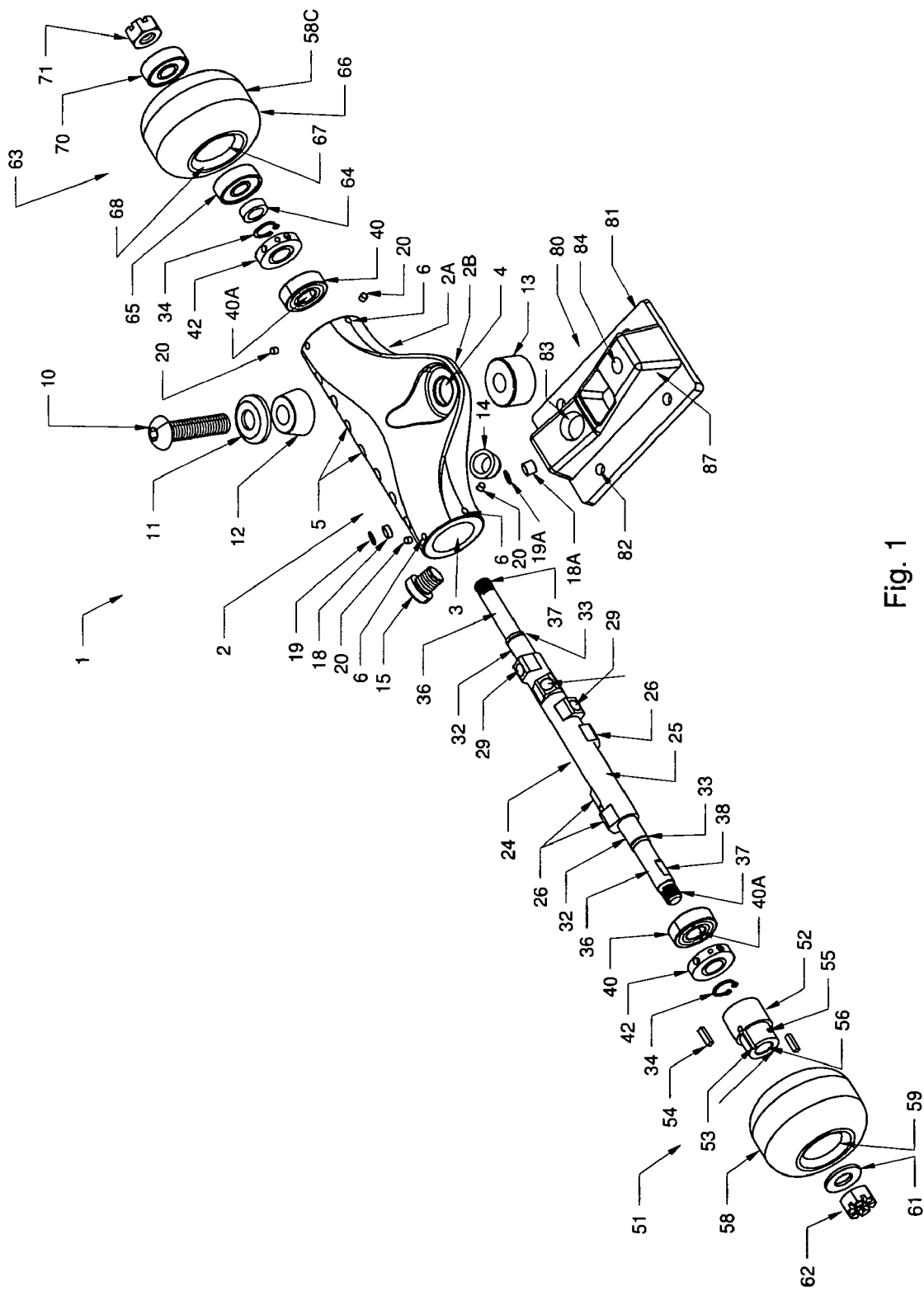
FIG. 1 is an exploded perspective view of a magnetic motor axle according to the present invention.

Shown throughout the Figures, the present invention is generally directed to a magnetic motor axle which is effective in augmenting the propulsion efficiency and duration of a skateboard rolling on a surface. The magnetic motor axle incorporates a simple design which magnetically augments the torque of at least one drive wheel on a skateboard to partially offset effects due to friction and drag and enhance the performance characteristics of the skateboard.

Referring initially to FIGS. 1, 2 and 23-30 of the drawings, a preferred embodiment of the magnetic motor axle of the present invention is generally indicated by reference numeral 1. As illustrated in the exploded view of FIG. 1, the magnetic motor axle 1 includes a truck 2 having an elongated main truck portion 2a which is traversed by a truck bore 3. A truck attachment flange 2b extends from the main truck portion 2a. A mount bolt opening 4 extends through the truck attachment flange 2b to facilitate mounting the truck 2 to a truck mount bracket 80. As illustrated in FIGS. 23-29, a truck extension 8 further extends from the main portion 2a of the truck 2 to facilitate mounting the truck 2 to the truck mount bracket 80, which will be hereinafter described.

As illustrated in FIGS. 27-30, multiple truck magnet seats 5 extend into the main truck portion 2a, in spaced-apart relationship to each other along the longitudinal axis thereof, and communicate with the truck bore 3. Each of the truck magnet seats 5 is circumscribed by a retaining ring groove 7. In like manner, multiple truck magnet seats 5a, each of which is circumscribed by a retaining ring groove 7a, extend through the main truck portion 2a in spaced-apart relationship to each other and communicate with the truck bore 3. The truck magnet seats 5a are aligned with and disposed across the truck bore 3 in substantially diametrically-opposed relationship to the respective truck magnet seats 5.

As illustrated in FIG. 1, a truck magnet 18, which may have a generally cylindrical configuration, is seated in each truck magnet seat 5. By way of example, the present inventor has been successful using Neodymium Disc permanent magnets manufactured by Miami Magnet Company of Miami, Fla. A retaining ring 19 typically snaps into the retaining ring groove 7 in each truck magnet seat 5 to retain the truck magnets 18 in the respective truck magnet seats 5. In like manner, a truck magnet 18a is seated in each truck magnet seat 5a which is located opposite each corresponding truck magnet seat 5. A retaining ring 19a typically snaps into the retaining ring groove 7a in each truck magnet seat 5a to retain the truck magnets 18a in the respective magnet seats 5a. It is understood that alternative techniques known by those skilled in the art, other than the retaining rings 19, 19a, can be used to retain the truck magnets 18, 18a in the respective truck magnet seats 5, 5a.

Figure 2:
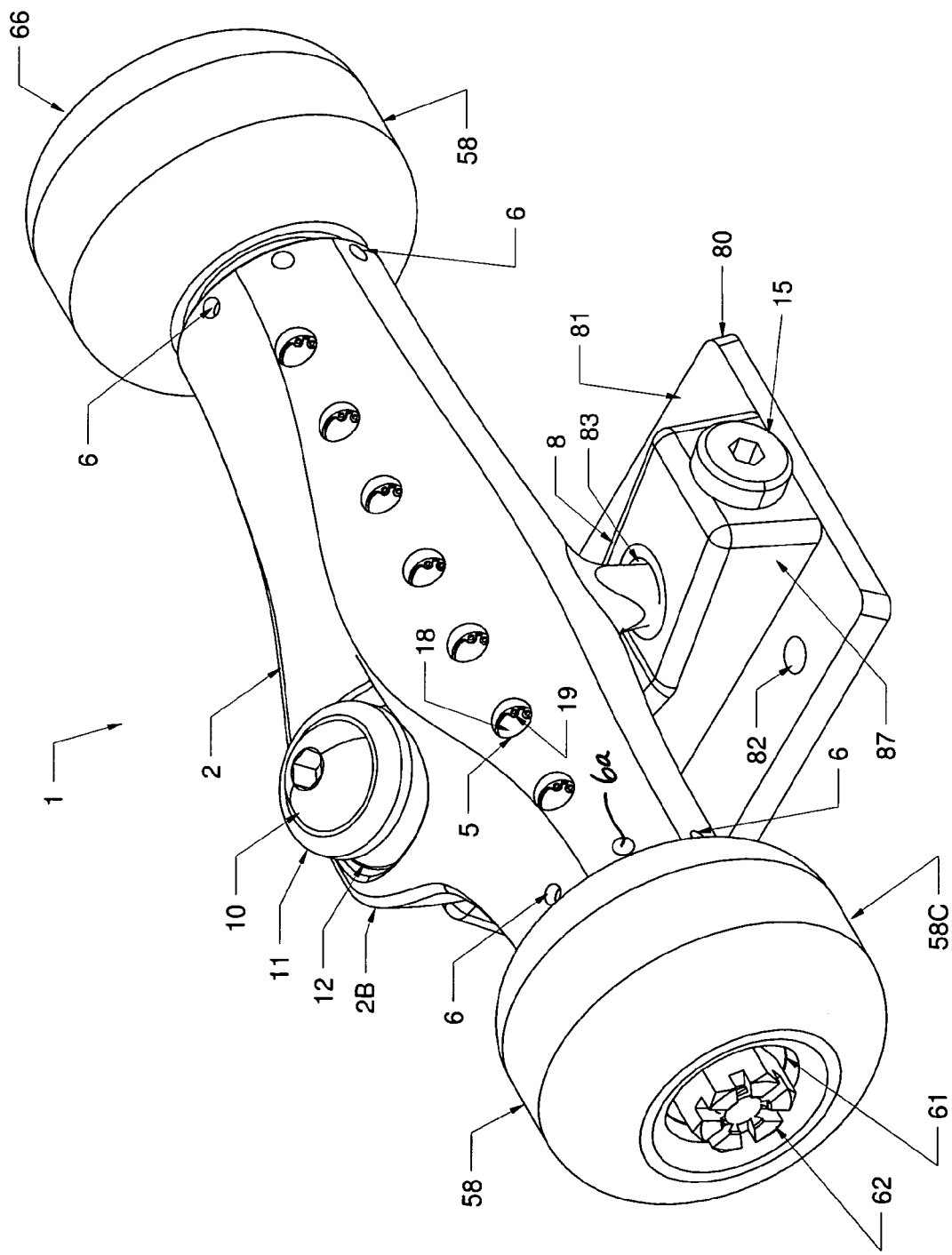
FIG. 2 is a perspective view of an assembled magnetic motor axle according to the present invention.

As illustrated in FIGS. 1, 2 and 26, in addition to the truck magnet seats 5, 5a, multiple disk magnet seats 6 may be provided in the end regions of the main truck portion 2a. The disk magnet seats 6 are spaced from each other around the circumference of the main truck portion 2a. As illustrated in FIG. 26, in a typical configuration, first and second pairs of the disk magnet seats 6 may be disposed in diametrically-opposed relationship with respect to each other across the truck bore 3. However, it will be understood that any number of the disk magnet seats 6 may be provided in the main truck portion 2a in any desired relationship with respect to each other. Access ports 6a, are also provided extending completely through each of the end regions of the main truck portion 2a, offset from the magnet seats 6. The access ports 6a are sized and oriented to enable access to the set screws 48 of the magnetic disk assemblies 42, using an Allen-type wrench or similar tool, in order to facilitate tightening and loosening of the set screws 48 against the flats 49 of rotor assembly axle segments 36. As illustrated in FIG. 1, a stationary magnet 20 is seated in each disk magnet seat 6. The stationary magnets 20 may be retained in the respective disk magnet seats 6 using a retaining ring (not illustrated), for example, as heretofore described with respect to the truck magnets 18 and 18a, or by using glue or other fastening technique known to those skilled in the art.

Figure 3:
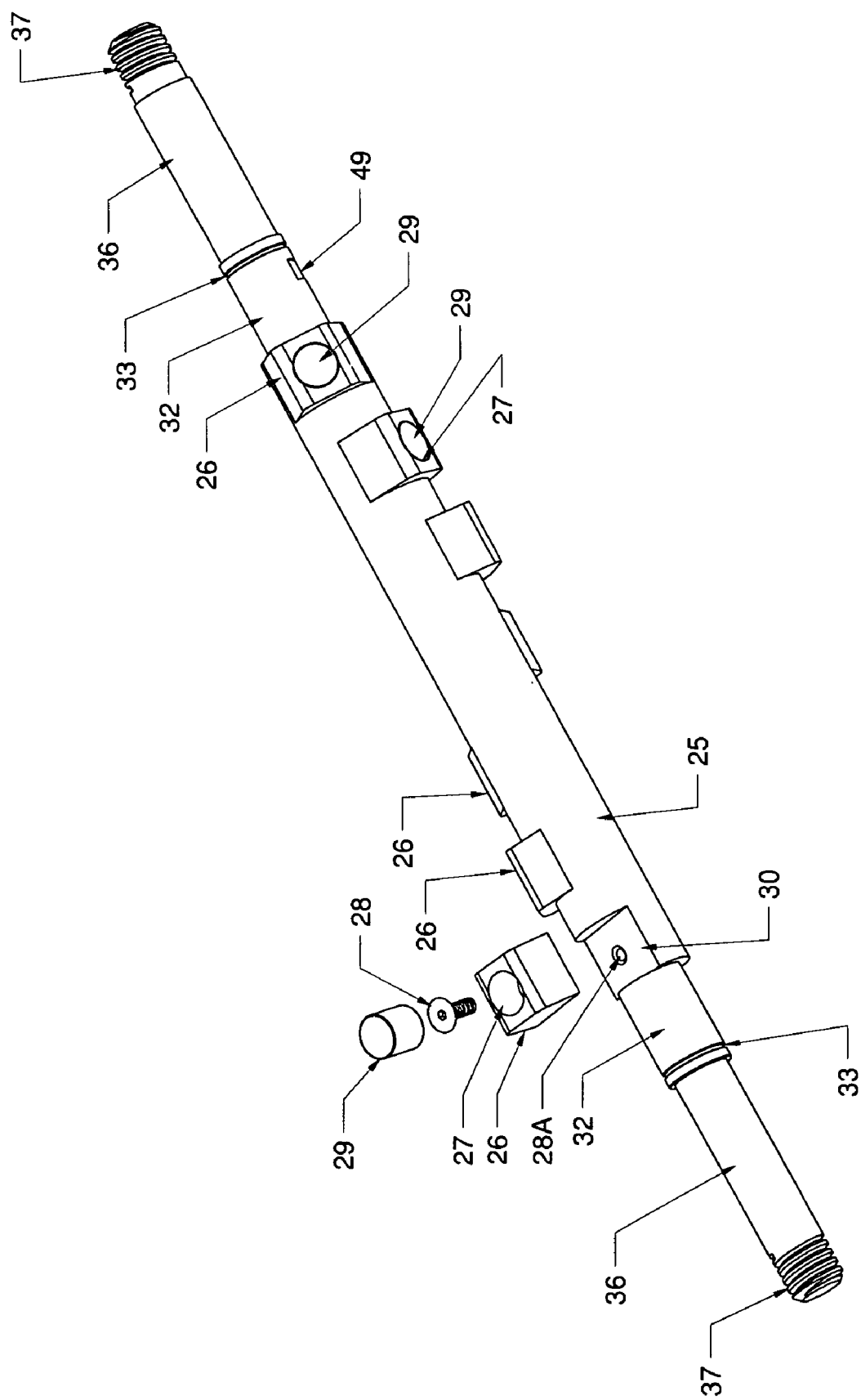
FIG. 3 is a perspective view of a rotor assembly element of the magnetic motor axle.

Referring next to FIGS. 1 and 3-7 of the drawings, a rotor assembly 24 is rotatably mounted in the truck bore 3 of the main truck portion 2a. The rotor assembly 24 includes an elongated central segment 25, disk mount segments 32 which extend from the respective ends of the central segment 25, and terminal axle segments 36 which extend from the respective disk mount segments 32. The disk mount segments 32 are smaller in diameter than the central segment 25, and the axle segments 36 are smaller in diameter than the disk mount segments 32. As illustrated in FIG. 3, a retaining ring groove 33 circumscribes each disk mount segment 32, adjacent to the junction of the disk mount segment 32 with the corresponding axle segment 36. A screw flat 49 is provided in each disk mount segment 32, adjacent to the ring groove 33. Multiple axle threads 37 are provided in each axle segment 36, adjacent to the end thereof.

Multiple, flat lobe seats 30 are provided in the central segment 25, in spaced-apart relationship to each other along the longitudinal axis of the central segment 25. From one end to the opposite end of the central segment 25, the lobe seats 30 are progressively arranged in a staggered array around the circumference of the central segment 25. A cap screw opening 28a extends into the center of each lobe seat 30. As illustrated in FIG. 3, a magnet lobe 26 is seated in each lobe seat 30 typically using a cap screw 28, as will be hereinafter further described.

As illustrated in FIGS. 8-10, each magnet lobe 26 typically includes a magnet opening 27. A cap screw opening 28b extends through the magnet lobe 26, at the bottom of the magnet opening 27. As illustrated in FIG. 3, each magnet lobe 26 is seated in the corresponding lobe seat 30. A lobe mount cap screw 28 is extended through the cap screw opening 28b (FIG. 10) in the bottom of the magnet lobe 26 and threaded into the underlying cap screw opening 28a in the lobe seat 30 to secure each magnet lobe 26 to the rotor assembly 24. As further illustrated in FIG. 3, a rotor magnet 29 is seated in the magnet opening 27 of each magnet lobe 26. The rotor magnet 29 may be retained in the magnet opening 27 using a retaining ring (not illustrated) or other retaining technique known by those skilled in the art.

As illustrated in FIG. 1, a sealed bearing 40, having a central bearing opening 40a, is mounted on each disk mount segment 32 of the rotor assembly 24. A magnetic disk assembly 42, the structural details of which will be hereinafter described, is mounted on each of the disk mount segments 32, adjacent to the corresponding sealed bearing 40. A retaining ring 34 snaps into the retaining ring groove 33 of each disk mount segment 32 to retain each sealed bearing 40 and adjacent magnetic disk assembly 42 on the corresponding disk mount segment 32.

Referring next to FIGS. 11-15 of the drawings, each magnetic disk assembly 42 includes an annular disk 43 having a central disk opening 43a. Preferably, annular disk 43 is constructed from either Brass (i.e., Copper and Zinc) or Bronze (i.e., Copper and Tin). An annular disk bushing 44 is provided in the disk opening 43a. Multiple magnet seats 45 extend into the outer surface of the disk 43, in circumferentially-spaced relationship with respect to each other. A set screw opening 47 extends through the disk 43 and disk bushing 44 and communicates with the disk opening 43a. As illustrated in FIGS. 13 and 15, a retaining ring groove 50 typically circumscribes each magnet seat 45.

As illustrated in FIG. 11, a disk magnet 46 is seated in each magnet seat 45. A retaining ring (not illustrated) snaps into each retaining ring groove 50 to retain each disk magnet 46 in the corresponding magnet seat 45. Alternative techniques may be used to secure the disk magnets 46 in the respective magnet seats 45. Each magnetic disk assembly 42 is secured to the corresponding disk mount segment 32 of the rotor assembly 42 by threading a set screw 48 into the set screw opening 47 and tightening the set screw 48 against the set screw flat 49 (FIG. 4) provided in each disk mount segment 32. The retaining ring 34 which snaps into the retaining ring groove 33 of the disk mount segment 32 prevents each sealed bearing 40 and magnetic disk assembly 42 pair from inadvertently becoming dislocated from the disk mount segment 32 and sliding onto the corresponding adjacent axle segment 36.

As illustrated in FIG. 1, in a preferred embodiment of the magnetic motor axle assembly 1, a drive wheel assembly 51 and a free wheel assembly 63 are mounted on the respective axle segments 36 of the rotor assembly 24. However, it is understood that a drive wheel assembly 51 may alternatively be provided on both axle segments 36. The drive wheel assembly 51 includes an elongated, generally cylindrical drive wheel bushing 52 which is drivingly engaged by a corresponding axle segment 36 of the rotor assembly 24, typically in a manner which will be hereinafter described. A drive wheel 58 is drivingly engaged by the drive wheel bushing 52 for augmenting the propulsion efficiency of a skateboard (not illustrated) of which the magnetic motor axle 1 is a part as the skateboard rolls on a surface, as will be hereinafter described.

Referring next to FIGS. 19-22, the drive wheel bushing 52 is generally cylindrical in configuration and is traversed by a central bore 56. Elongated key slots 53 are provided in the exterior surface of the drive wheel bushing 52, typically in diametrically-opposed relationship with respect to each other across the bore 56. A set screw opening 55 extends through the drive wheel bushing 52, typically between the key slots 53, and communicates with the bore 56.

Figure 16:
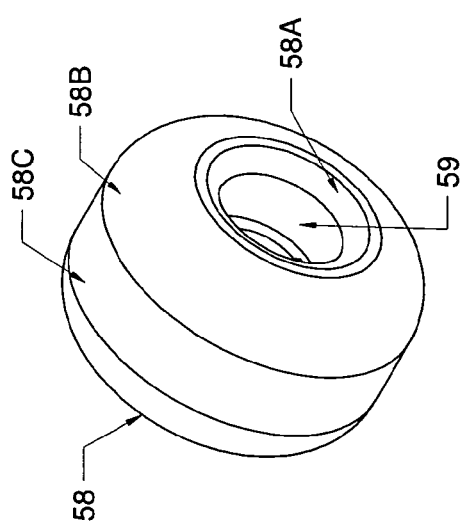
FIG. 16 is a perspective view of a drive wheel element of the magnetic motor axle.
Figure 18:
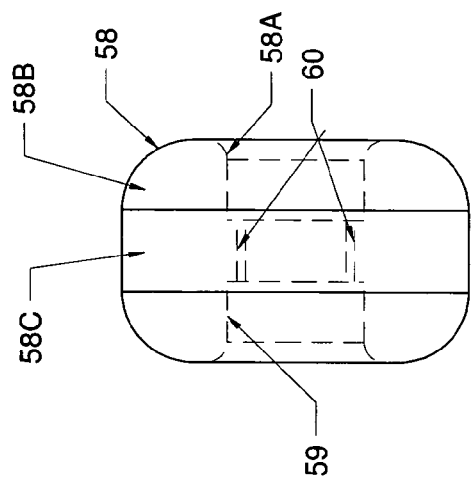
FIG. 18 is a side view of the drive wheel, with an interior axle opening and key slots shown in phantom.
Figure 17:
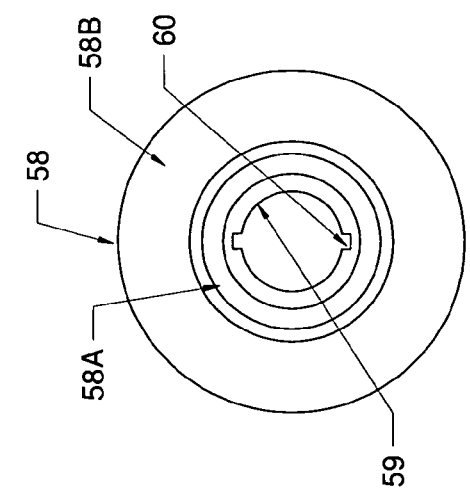
FIG. 17 is a front view of the drive wheel shown in FIG. 16.
Figure 19:
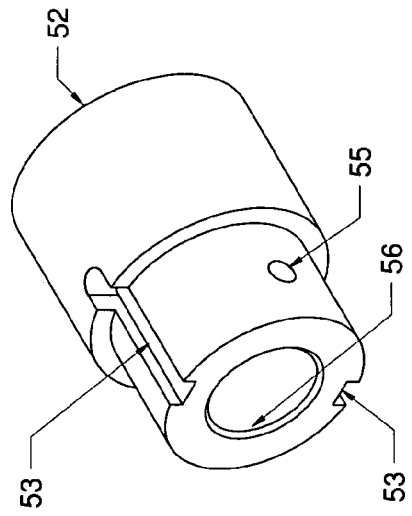
FIG. 19 is a perspective view of a drive wheel bushing element of the magnetic motor axle.
Figure 22:
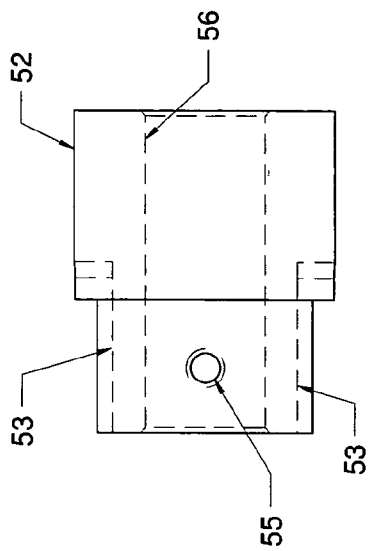
FIG. 22 is a side view of the drive wheel bushing, with an interior bore and key slots shown in phantom.
Figure 20:
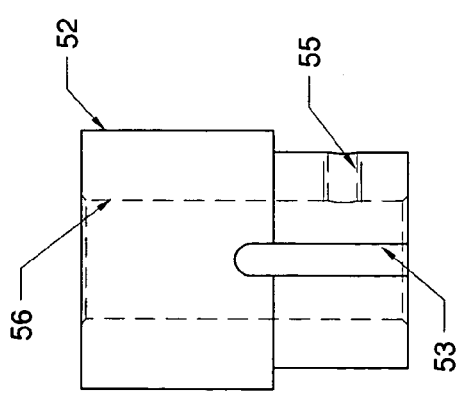
FIG. 20 is a side view of the drive wheel bushing, with an interior bore and a set screw opening shown in phantom.
Figure 21:
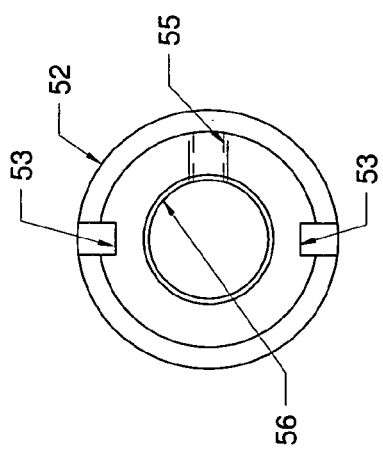
FIG. 21 is an end view of the drive wheel bushing.
Figure 25:
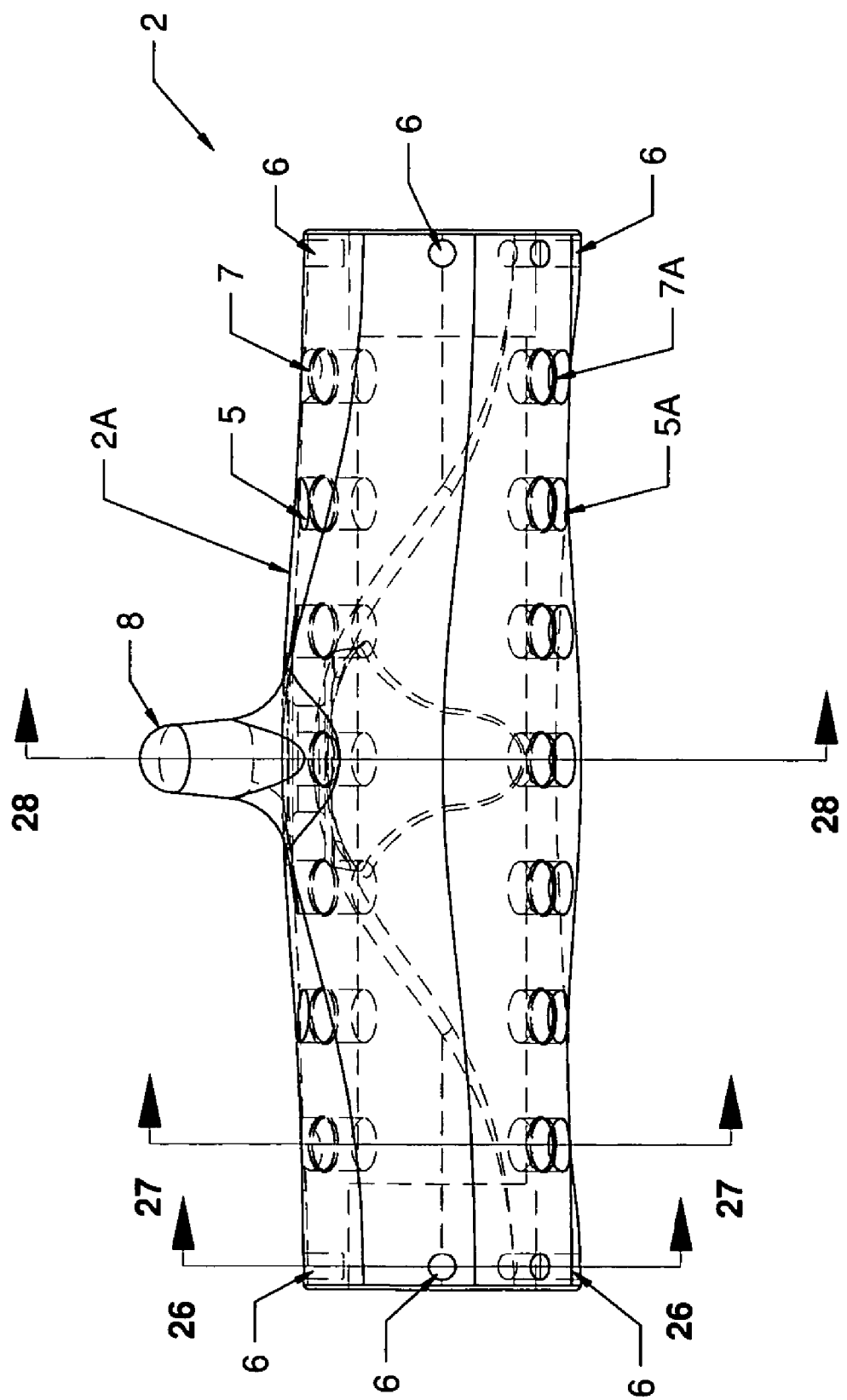
FIG. 25 is a rear view of the truck.
Figure 30:
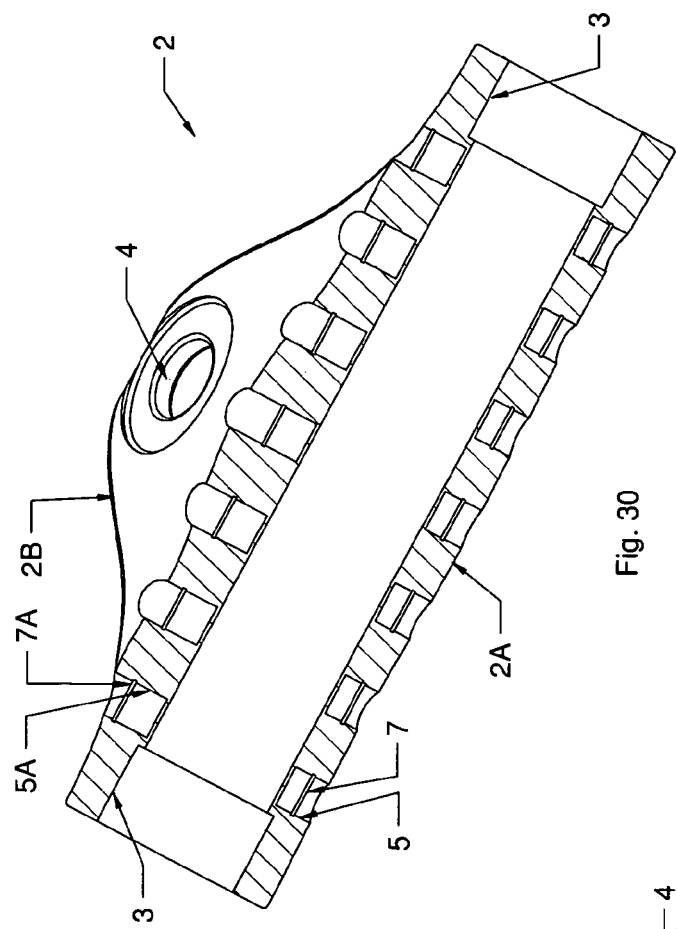
FIG. 30 is a longitudinal sectional view of the truck, taken along section lines 30-30 in FIG. 29.
Figure 29:
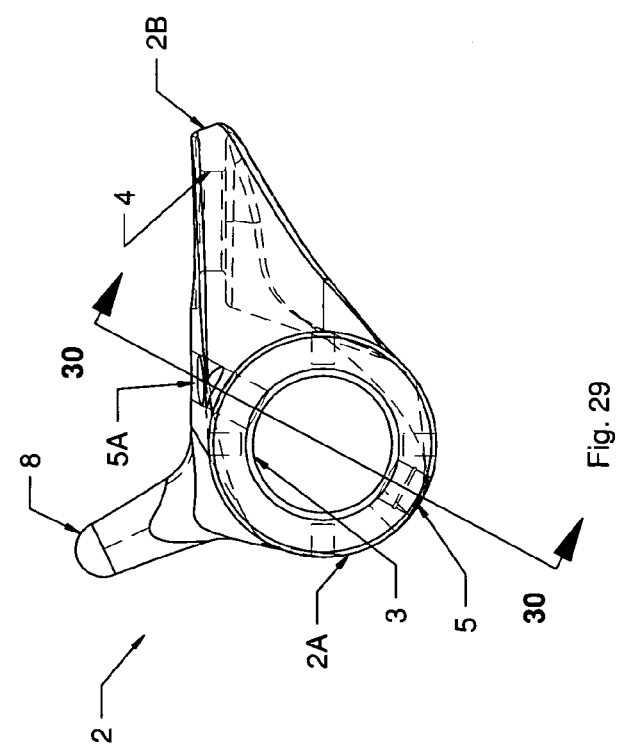
FIG. 29 is an end view of the truck.
Figure 31:
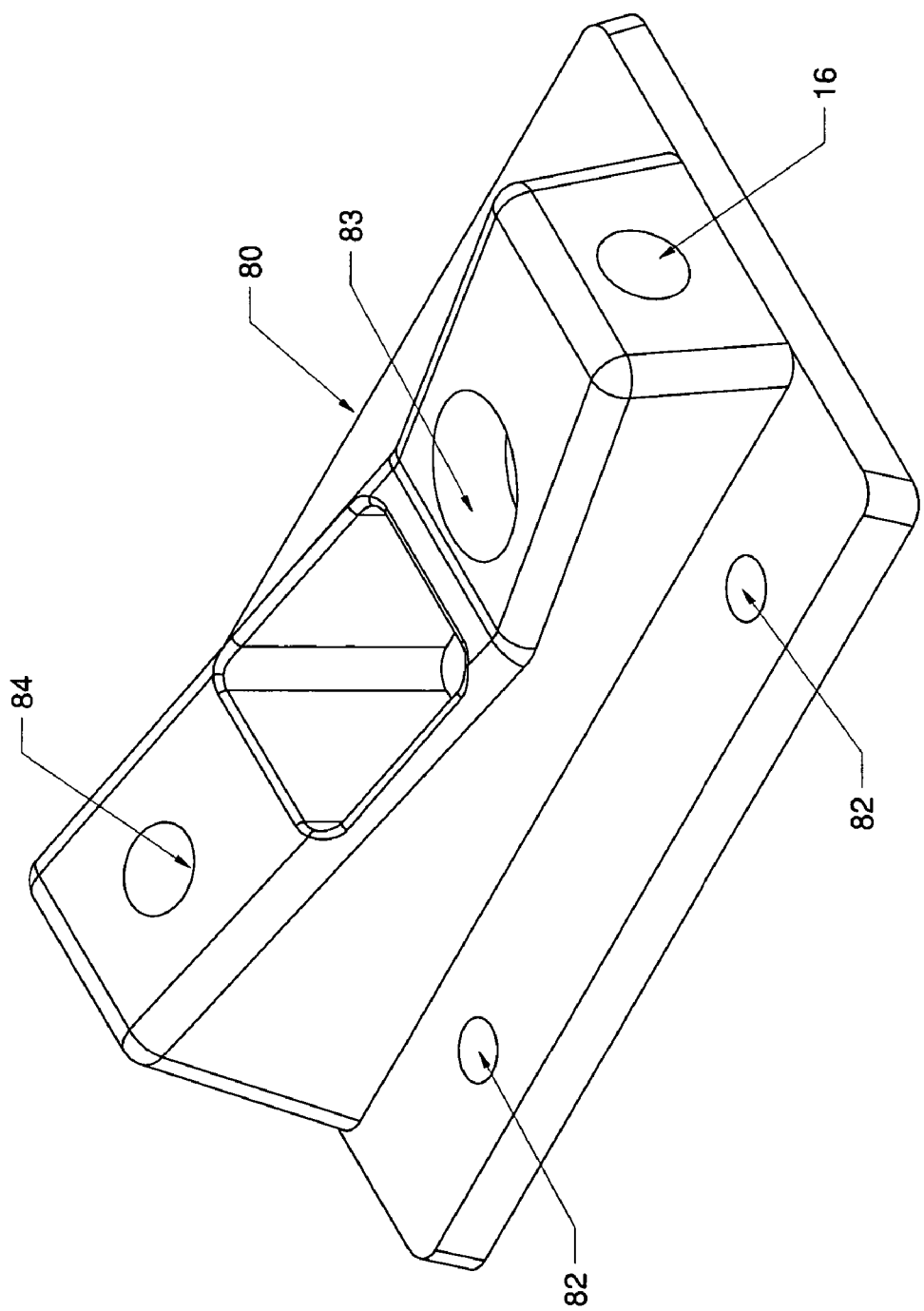
FIG. 31 is a perspective view of a truck mount bracket for mounting the truck onto a step board (not illustrated) of a skateboard.
Figure 35:
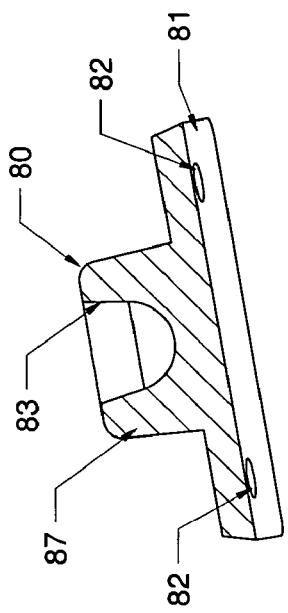
FIG. 35 is a cross-sectional view of the truck mount bracket, taken along section lines 35-35 in FIG. 34.
Figure 33:
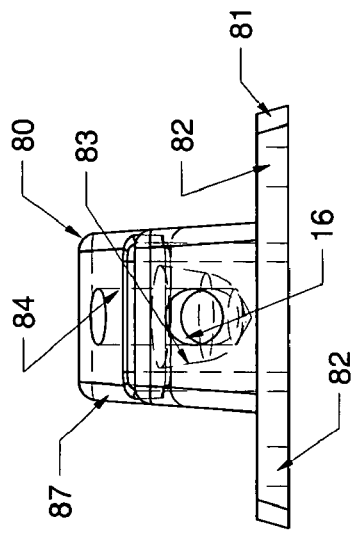
FIG. 33 is an end view of the truck mount bracket, with an interior housing extension seat, housing mount bolt opening and set screw opening shown in phantom.
Figure 32:
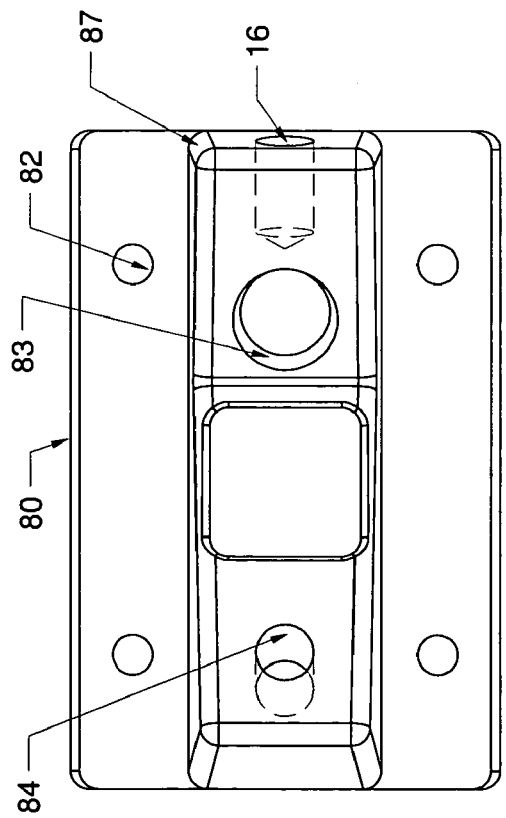
FIG. 32 is a top view of the truck mount bracket.
Figure 34:
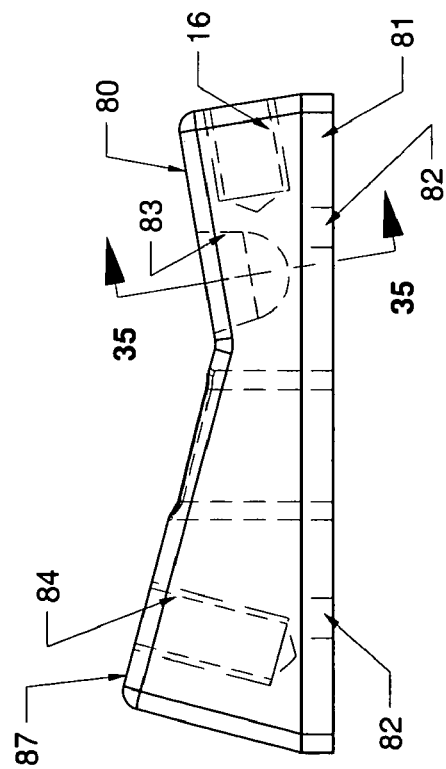
FIG. 34 is a side view of the truck mount bracket.

Referring next to FIGS. 16-18 of the drawings, the drive wheel 58 includes a hub 58a on which is mounted an outer portion 58b. The outer portion 58b may be polyurethane, for example. A traction band 58c, which may be any suitable material having a high coefficient of friction, typically circumscribes the outer portion 58b. An axle opening 59 extends through the hub 58a. Key slots 60 typically extend through the hub 58a, typically in diametrically-opposed relationship to each other across the axle opening 59. The axle opening 59 receives the corresponding axle segment 36 of the rotor assembly 24.

In assembly of the drive wheel assembly 51, the drive wheel bushing 52 is initially mounted on the axle segment 36 of the rotor assembly 24 typically by inserting the axle segment 36 through the bore 56 of the drive wheel bushing 52, threading a set screw (not illustrated) through the set screw opening 55, and tightening the set screw against a set screw flat 38 provided in the axle segment 36. The drive wheel 58 is mounted on the drive wheel bushing 52 by initially aligning the key slots 60 (FIG. 17) in the drive wheel 58 with the respective the key slots 53 (FIG. 19) in the drive wheel bushing 52 and inserting a key 54 into each pair of aligned key slots 53, 60, as illustrated in FIG. 1. A washer 61 is then inserted on the axle segment 36, and a hex nut 62 is threaded on the axle threads 37 and tightened against the washer 61 to secure the drive wheel assembly 51 on the axle segment 36.

The free wheel assembly 63 typically includes a free wheel spacer 64 which is inserted on the axle segment 36 of the rotor assembly 24, adjacent to the corresponding magnetic disk assembly 42. An inside wheel bearing 65 and an outside wheel bearing 70 are provided in a bearing opening 67 that extends through the hub 68 of a free wheel 66. The free wheel 66 may be the same in design as the drive wheel 58 heretofore described with respect to FIGS. 16-18 (except without the key slots 60). The inside wheel bearing 65 and outside wheel bearing 70 are inserted on the axle segment 36 to permit free rotation of the free wheel 66 on the axle segment 36. A hex nut 71 is threaded onto the axle threads 37 of the axle segment 36 to secure the free wheel assembly 63 on the axle segment 36.

In the assembled magnetic motor axle 1, the rotor assembly 24 extends through the truck bore 3 in the main truck portion 2a of the truck 2. The sealed bearings 40 fixedly engage the interior surface of the main truck portion 2a in the truck bore 3 such that the rotor assembly 24 is capable of rotating freely in the bearing openings 40a of the respective sealed bearings 40. The rotor magnets 29 of the rotor assembly 24 are aligned with the respective truck magnets 18 of the truck 2. Accordingly, as the rotor assembly 24 rotates in the truck bore 3, the rotor magnets 29 rotate past the respective stationary truck magnets 18. Because the polarity of the rotor magnets 29 is the same as that of the truck magnets 18, the truck magnets 18 repel the rotor magnets 29 each time the rotor magnets 29 are rotated into proximity with the truck magnets 18. This magnetic repulsive effect imparts torque to the rotor assembly 24. The rotor assembly 24, in turn, transmits torque to the drive wheel 58 through the drive wheel bushing 52.

A truck mount bracket 81 may be used to attach the assembled magnetic motor axle 1 to a step board (not shown) of a skateboard. Referring to FIGS. 2 and 31-35 of the drawings, the truck mount bracket 80 may include a generally planar base 81. Multiple bolt openings 82 typically extend through the base 81 to facilitate bolted attachment of the truck mount bracket 81 to the bottom surface of the step board. An elongated bracket cradle 87 typically extends from the base 81. The bracket cradle 87 includes a housing extension seat 83, which receives a rubber grommet 14 (FIG. 1), and a housing mount bolt opening 84. A front grinder bolt opening 16 extends into one end of the bracket cradle 87, adjacent to the housing extension seat 83. As illustrated in FIG. 2, a front grinder bolt 15 is threaded into the front grinder bolt opening 16 for purposes which will be hereinafter described.

As illustrated in FIG. 2, the truck 2 is attached to the truck mount bracket 80 by initially inserting the truck extension 8 of the truck 2 into the housing extension seat 83 of the bracket cradle 87. The front grinder bolt 15 is threaded into the front grinder bolt opening 16 and tightened against the portion of the truck extension 8 which extends into the housing extension seat 83 of the bracket cradle 87. As illustrated in FIG. 1, a straight bushing 13 is interposed between the truck attachment flange 2b of the truck 2 and the bracket cradle 87, with the mount bolt opening 4 of the truck attachment flange 2b disposed in alignment with the housing mount bolt opening 84 through the straight bushing 13. A tapered bushing 12 is seated in the truck attachment flange 2b. A housing mount bolt 10 is extended through a washer 11, the tapered bushing 12, the mount bolt opening 4 in the truck attachment flange 2b and the straight bushing 13, respectively; and is threaded into the housing mount bolt opening 84 of the truck mount bracket 80. The truck mount bracket 80 is attached to the step board by inserting mount bolts (not illustrated) through the respective bolt openings 82 in the base 81 and threading the mount bolts into respective bolt openings (not illustrated) provided in the step board.

In use of the invention, at least one assembled magnetic motor axle 1 is attached to a step board (not illustrated) of a skateboard typically using the truck mount bracket 80 as heretofore described. If desired, a pair of front and rear magnetic motor axles 1 can be attached to the step board to provide a front drive wheel 58 and front free wheel 66 on the front magnetic motor axle 1, as well as a rear drive wheel 58 and a rear free wheel 66 on the rear magnetic motor axle 1. The skateboard is supported on a surface (not shown) by the skateboard wheels, including the drive wheel 58 and the free wheel 66. As a skateboard rider (not illustrated) propels the skateboard along the surface, the drive wheel 58, through the drive wheel bushing 52, rotates the rotor assembly 24 in the truck bore 3. This causes the rotor magnets 29 to repeatedly rotate past the respective stationary truck magnets 18, and thus, the truck magnets 18 to repel the rotor magnets 29. Accordingly, the magnetic repulsive effect imparts torque on the rotor assembly 24 which, in turn, transmits torque to the drive wheel 58 through the drive wheel bushing 52. The drive wheel 58 rotates against the surface on which the skateboard is rolling to augment and prolong the skateboard propulsion efficiency and duration. It will be appreciated by those skilled in the art that, due to the staggered arrangement of the rotor magnets 29 about the circumference of the rotor assembly 24, the rotor magnets 29 are sequentially repelled by the respective truck magnets 18 during rotation of the rotor assembly 24. Therefore, one of the rotor magnets 29 is constantly being repelled by a corresponding truck magnet 18 as the skateboard rolls on the surface. This provides a continuous application of torque to the rotor assembly 24, and thus, to the drive wheel 58 as long as the skateboard rolls on the surface.

The torque applied to the drive wheel 58 by the truck magnets 18 and rotor magnets 29 is augmented by the magnetic disc assemblies 42. Accordingly, as each magnetic disk assembly 42 rotates on the corresponding disk mount segment 32 of the rotor assembly 24, the disk magnets 46 of the magnetic disk assembly 42 sequentially rotate adjacent to and beyond the stationary magnets 20 seated in the respective disk magnet seats 6 of the truck 2. The stationary magnets 20 repel the disk magnets 46, thus applying torque to the magnetic disk assembly 42. The magnetic disk assembly 42, in turn, transmits torque to the rotor assembly 24, thereby augmenting the magnetic torque applied to the rotor assembly 24 by the truck magnets 18 and rotor magnets 29.

While the preferred embodiments of the invention have been described above, it will be recognized and understood that various modifications can be made in the invention and the appended claims are intended to cover all such modifications which may fall within the spirit and scope of the invention. For instance, it will be apparent to those skilled in the art that the unique magnetic motor axle of the present invention could be employed in a host of additional applications incorporating a rotating axle member. For example, the magnetic motor axle could be incorporated into a motorized fan apparatus to enhance its rotational efficiency. In that case, an electric motor could be employed to drive rotation of the axle at one end of the magnetic rotor assembly, with the magnet interactions of the rotor assembly, as heretofore described, enhancing rotation of a fan element at an opposite end of the axle. One obvious benefit of such a design would be a reduced power requirement, that is, the ability to operate the fan using a lower-powered motor.

What is claimed is:

1. A magnetic motor axle for a skateboard, comprising:
a truck for mounting on a step board;
an elongated rotor assembly rotatably carried by said truck;
a plurality of rotor magnets carried by said rotor assembly, wherein said rotor magnets are not electro-magnets;
a plurality of truck magnets carried by said truck for magnetically repelling said plurality of rotor magnets, respectively;
wherein said truck magnets are not electro-magnets;
at least one drive wheel drivingly engaged by said rotor assembly; and
at least one magnetic disk assembly having a plurality of disk magnets carried by said rotor assembly and a plurality of stationary magnets carried by said truck for magnetically repelling said plurality of disk magnets, respectively, wherein said disk magnets and stationary magnets are non-electro-magnets.

2. The magnetic motor axle of claim 1 wherein said at least one magnetic disk assembly comprises a pair of magnetic disk assemblies.

3. The magnetic motor axle of claim 1 wherein said at least one magnetic disk assembly comprises a disk carried by said rotor assembly and wherein said plurality of disk magnets is carried by said disk.

4. The magnetic motor axle of claim 1 further comprising a free wheel carried by said rotor assembly.

5. The magnetic motor axle of claim 4 further comprising at least one magnetic disk assembly having a plurality of disk magnets carried by said rotor assembly and a plurality of stationary magnets carried by said truck for magnetically repelling said plurality of stationary magnets, respectively.

6. The magnetic motor axle of claim 5 wherein said at least one magnetic disk assembly comprises a pair of magnetic disk assemblies.

7. The magnetic motor axle of claim 6 wherein said pair of magnetic disk assemblies each comprises a disk carried by said rotor assembly and wherein said plurality of disk magnets is carried by said disk.

8. A magnetic motor axle for a skateboard, comprising:
a truck for mounting on a step board;
an elongated rotor assembly rotatably carried by said truck;
a plurality of rotor magnets carried by said rotor assembly, wherein said rotor magnets are non electro-magnets;
a first set of truck magnets carried by said truck on a first side of said rotor assembly and a second set of truck magnets carried by said truck on a second side of said rotor assembly for magnetically repelling said plurality of rotor magnets, respectively, wherein said truck magnets are non electro-magnets;
at least one drive wheel drivingly engaged by said rotor assembly; and
at least one magnetic disk assembly having a plurality of disk magnets carried by said rotor assembly and a plurality of stationary magnets carried by said truck for magnetically repelling said plurality of disk magnets, respectively, wherein said disk magnets and stationary magnets are non-electro-magnets.

9. The magnetic motor axle of claim 8 wherein said at least one magnetic disk assembly comprises a pair of magnetic disk assemblies.

10. The magnetic motor axle of claim 9 wherein said pair of magnetic disk assemblies each comprises a disk carried by said rotor assembly and wherein said plurality of disk magnets is carried by said disk.

11. The magnetic motor axle of claim 8 further comprising a free wheel carried by said rotor assembly.

12. The magnetic motor axle of claim 11 further comprising at least one magnetic disk assembly having a plurality of disk magnets carried by said rotor assembly and a plurality of stationary magnets carried by said truck for magnetically repelling said plurality of stationary magnets, respectively.

13. The magnetic motor axle of claim 12 wherein said at least one magnetic disk assembly comprises a pair of magnetic disk assemblies.

14. The magnetic motor axle of claim 13 wherein said pair of magnetic disk assemblies each comprises a disk carried by said rotor assembly and wherein said plurality of disk magnets is carried by said disk.

15. A magnetic motor axle for a skateboard, comprising:
a truck for mounting on a step board;
an elongated, generally cylindrical rotor assembly rotatably carried by said truck;
a plurality of spaced-apart rotor magnets carried by said rotor assembly, said rotor magnets arranged in a generally staggered relationship to each other around a circumference of said rotor assembly, wherein said rotor magnets are non electro-magnets;
a plurality of truck magnets carried by said truck for magnetically repelling said plurality of rotor magnets, respectively, wherein said truck magnets are non electro-magnets;
at least one drive wheel drivingly engaged by said rotor assembly; and
at least one magnetic disk assembly having a plurality of disk magnets carried by said rotor assembly and a plurality of stationary magnets carried by said truck for magnetically repelling said plurality of disk magnets, respectively, wherein said disk magnets and stationary magnets are non electro-magnets.

16. The magnetic motor axle of claim 15 wherein said at least one magnetic disk assembly comprises a pair of magnetic disk assemblies.

17. The magnetic motor axle of claim 16 further comprising a free wheel carried by said rotor assembly.

18. The magnetic motor axle of claim 17 wherein said rotor assembly comprises an elongated central segment, a pair of disk mount segments extending from said central segment and a pair of axle segments extending from said pair of disk mount segments, respectively; and wherein said plurality of rotor magnets is carried by said central segment, said pair of magnetic disk assemblies is carried by said pair of disk mount segments, respectively, and said at least one drive wheel and said free wheel are carried by said pair of axle segments, respectively.

19. The magnetic motor axle of claim 15 wherein said plurality of truck magnets comprises a first set of truck magnets carried by said truck on a first side of said rotor assembly and a second set of truck magnets carried by said truck on a second side of said rotor assembly.

20. The magnetic motor axle of claim 19 further comprising a pair of magnetic disk assemblies each having a plurality of disk magnets carried by said rotor assembly and a plurality of stationary magnets carried by said truck for magnetically repelling said plurality of disk magnets, respectively.

21. The magnetic motor axle of claim 20 further comprising a free wheel carried by said rotor assembly.

22. The magnetic motor axle of claim 21 wherein said rotor assembly comprises an elongated central segment, a pair of disk mount segments extending from said central segment and a pair of axle segments extending from said pair of disk mount segments, respectively; and wherein said plurality of rotor magnets is carried by said central segment, said pair of magnetic disk assemblies is carried by said pair of disk mount segments, respectively, and said at least one drive wheel and said free wheel are carried by said pair of axle segments, respectively.

* * * * *